(12) United States Patent
Sasaki et al.

(10) Patent No.: US 10,710,573 B2
(45) Date of Patent: Jul. 14, 2020

(54) VEHICLE AND CONTROL METHOD OF VEHICLE

(71) Applicant: TOYOTA JIDOSHA KABUSHIKI KAISHA, Toyota-shi, Aichi-ken (JP)

(72) Inventors: Keisuke Sasaki, Susono (JP); Hiroyoshi Ueda, Chigasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/293,830

(22) Filed: Mar. 6, 2019

(65) Prior Publication Data

US 2019/0293000 A1    Sep. 26, 2019

(30) Foreign Application Priority Data

Mar. 22, 2018 (JP) ................. 2018-054656

(51) Int. Cl.
*B60W 20/16* (2016.01)
*B60W 10/06* (2006.01)
*B60K 6/445* (2007.10)
*B60W 10/08* (2006.01)
*F02D 41/06* (2006.01)

(52) U.S. Cl.
CPC ............. *B60W 20/16* (2016.01); *B60K 6/445* (2013.01); *B60W 10/06* (2013.01); *B60W 10/08* (2013.01); *F02D 41/068* (2013.01); *B60W 2510/068* (2013.01); *B60W 2710/0672* (2013.01); *B60W 2710/083* (2013.01); *F02D 2200/0802* (2013.01); *F02D 2250/26* (2013.01)

(58) Field of Classification Search
CPC ....... B60K 6/445; B60W 10/06; B60W 10/08; B60W 20/16; B60W 2510/068; B60W 2710/0672; B60W 2710/083; F02D 41/0255; F02D 41/068; F02D 2200/0802; F02D 2250/26
See application file for complete search history.

(56) References Cited

U.S. PATENT DOCUMENTS

2011/0224856 A1   9/2011   Falkenstein
2016/0052508 A1   2/2016   Teraya et al.

FOREIGN PATENT DOCUMENTS

DE   102008042544 A1   4/2010
DE   102012009481 A1   11/2013
DE   102014214431 A1   1/2016

(Continued)

OTHER PUBLICATIONS

Yamazaki, JP H07-180568, machine translation. (Year: 1995).*

*Primary Examiner* — Hung Q Nguyen
*Assistant Examiner* — Mark L. Greene
(74) *Attorney, Agent, or Firm* — Oliff PLC (57) ABSTRACT

A vehicle includes an internal combustion engine, a catalyst provided in an exhaust passage of the internal combustion engine, and an electronic control unit. The electronic control unit is configured to control an engine torque such that a first torque change amount of the engine torque when the temperature of the catalyst belongs to a predetermined low temperature region to be lower than a second torque change amount of the engine torque when the temperature of the catalyst belongs to a high temperature region. The high temperature region is a region having a temperature higher than the low temperature region.

8 Claims, 8 Drawing Sheets

(56) References Cited

FOREIGN PATENT DOCUMENTS

| | | | |
|---|---|---|---|
| JP | 07180568 A | * | 7/1995 |
| JP | 2005-233088 A | | 9/2005 |
| JP | 2014-210566 A | | 11/2014 |

* cited by examiner

VEHICLE AND CONTROL METHOD OF VEHICLE

INCORPORATION BY REFERENCE

The disclosure of Japanese Patent Application No. 2018-054656 filed on Mar. 22, 2018 including the specification, drawings and abstract is incorporated herein by reference in its entirety.

BACKGROUND

1. Technical Field

The disclosure relates to a vehicle control system and particularly to a vehicle including an engine and a control method a vehicle.

2. Description of Related Art

Japanese Patent Application Publication No. 2014-210566 (JP 2014-210566 A) discloses a control system for a hybrid vehicle including an engine and a traveling motor. In the control system, an engine output is controlled so that an engine output becomes constant when catalyst warm-up is required. Accordingly, since an engine operation point can be closer to an operation region having high fuel efficiency, fuel efficiency performance during catalyst warm-up is improved.

SUMMARY

However, the above-described related art has following problems. That is, even when the output of the engine is controlled to be constant, an engine torque which is generated by the engine in the meantime changes. When an abrupt change in engine torque occurs during the warm-up of the catalyst, an air-fuel ratio also changes accordingly, and there is concern that exhaust emission characteristics may be deteriorated.

The disclosure suppresses deterioration of exhaust emission characteristics even when a catalyst is warming up in a vehicle equipped with an internal combustion engine.

A first aspect of the disclosure is a vehicle. The vehicle includes: an internal combustion engine; a catalyst that is provided in an exhaust passage of the internal combustion engine; and an electronic control unit. The electronic control unit is configured to control an engine torque such that a first torque change amount of the engine torque to be lower than a second torque change amount of the engine torque. The first torque change amount is a torque change amount when a temperature of the catalyst belongs to a predetermined low temperature region. The second torque change amount is a torque change amount when the temperature of the catalyst belongs to a high temperature region. The high temperature region is a region having a temperature higher than the low temperature region.

With the above-described configuration, when the temperature of the catalyst belongs to the low temperature region, the torque change amount of the engine torque is set to be lower than that of a case where the temperature of the catalyst belongs to the high temperature region. Accordingly, since a change in air-fuel ratio when the temperature of the catalyst belongs to the low temperature region is suppressed, it is possible to suppress deterioration of exhaust emission characteristics.

The vehicle may further include: an electric motor which is connected to a vehicle wheel via a power transmission mechanism and a battery that stores electric power for driving the electric motor. The electronic control unit may be configured to control the engine torque and a motor torque transmitted to the vehicle wheel by the electric motor based on a required driving force required for the vehicle.

With the above-described configuration, the vehicle is equipped with the internal combustion engine and the electric motor driven by the battery. For this reason, according to the above-described configuration, since it is possible to control the engine torque generated by the internal combustion engine and the motor torque transmitted to the vehicle wheel by the electric motor, it is possible to optimize the torque control depending on a situation.

In the vehicle, the electronic control unit may be configured to supplement a torque that is insufficient for the engine torque by the motor torque such that a driving force of the vehicle becomes closer to the required driving force when the temperature of the catalyst belongs to the low temperature region.

With the above-described configuration, when the temperature of the catalyst belongs to the low temperature region, a shortage of the required driving force is supplemented by the motor torque. Accordingly, even when the torque change amount of the engine torque becomes low, the vehicle driving force can be closer to the required driving force.

In the vehicle, the electronic control unit may be configured to control an engine torque such that the first torque change amount of the engine torque when the temperature of the catalyst is lower than a predetermined determination temperature to be lower than the second torque change amount of the engine torque when the temperature of the catalyst is higher than the determination temperature.

With the above-described configuration, the torque change amount during the warm-up of the catalyst is set to be lower than the torque change amount after the warm-up of the catalyst. Accordingly, it is possible to suppress a change in air-fuel ratio during the warm-up of the catalyst where the purification performance is low and to increase the responsiveness of the engine torque after the warm-up of the catalyst.

In the vehicle, the electronic control unit may be configured to increase the first torque change amount of the engine torque as the temperature of the catalyst increases when the temperature of the catalyst is lower than the predetermined determination temperature.

With the above-described configuration, the torque change amount during the warm-up of the catalyst increases as the catalyst temperature increases. Accordingly, since it is possible to increase the torque change amount as the purification performance of the catalyst increases, it is possible to suppress deterioration of exhaust emission characteristics and to optimize torque responsiveness.

In the vehicle, the electronic control unit may be configured to control an engine torque such that the first torque change amount of the engine torque for a predetermined period until a predetermined determination time elapses from a cold start of the internal combustion engine to be lower than the second torque change amount of the engine torque after the predetermined determination time elapses.

The elapse time from the cold start becomes an index of the warm-up degree of the catalyst. For this reason, according to the above-described configuration, it is possible to suppress deterioration of exhaust emission characteristics by controlling the torque change amount using the elapse time from the cold start.

In the vehicle, the electronic control unit may be configured to gradually increase the first torque change amount of the engine torque for the predetermined period.

With the above-described configuration, the torque change amount for the elapse time from the cold start increases as the catalyst temperature increases. Accordingly, since it is possible to increase the torque change amount as the purification performance of the catalyst increases, it is possible to suppress deterioration of exhaust emission characteristics and to optimize torque responsiveness.

A second aspect of the disclosure is a control method of a vehicle. The vehicle includes an internal combustion engine, a catalyst provided in an exhaust passage of the internal combustion engine, and an electronic control unit. The control method includes: controlling, by the electronic control unit, an engine torque such that a first torque change amount of the engine torque to be lower than a second torque change amount of the engine torque. The first torque change amount is a torque change amount when a temperature of the catalyst belongs to a predetermined low temperature region. The second torque change amount is a torque change amount when the temperature of the catalyst belongs to a high temperature region. The high temperature region is a region having a temperature higher than the low temperature region.

With the above-described configuration, when the temperature of the catalyst belongs to the low temperature region, the torque change amount of the engine torque is set to be lower than that of a case where the temperature of the catalyst belongs to the high temperature region. Accordingly, since a change in air-fuel ratio when the temperature of the catalyst belongs to the low temperature region is suppressed, it is possible to suppress deterioration of exhaust emission characteristics.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings. However, when referring to the number, amount, quantity, range, and the like of each component in the embodiments to be described below, the disclosure is not limited to the mentioned number unless otherwise specified or unless the number is clearly specified in principle. Further, the structure or step illustrated in the embodiments to be described below is not essential to the disclosure unless otherwise specified or clearly specified in principle.

Figure 1:
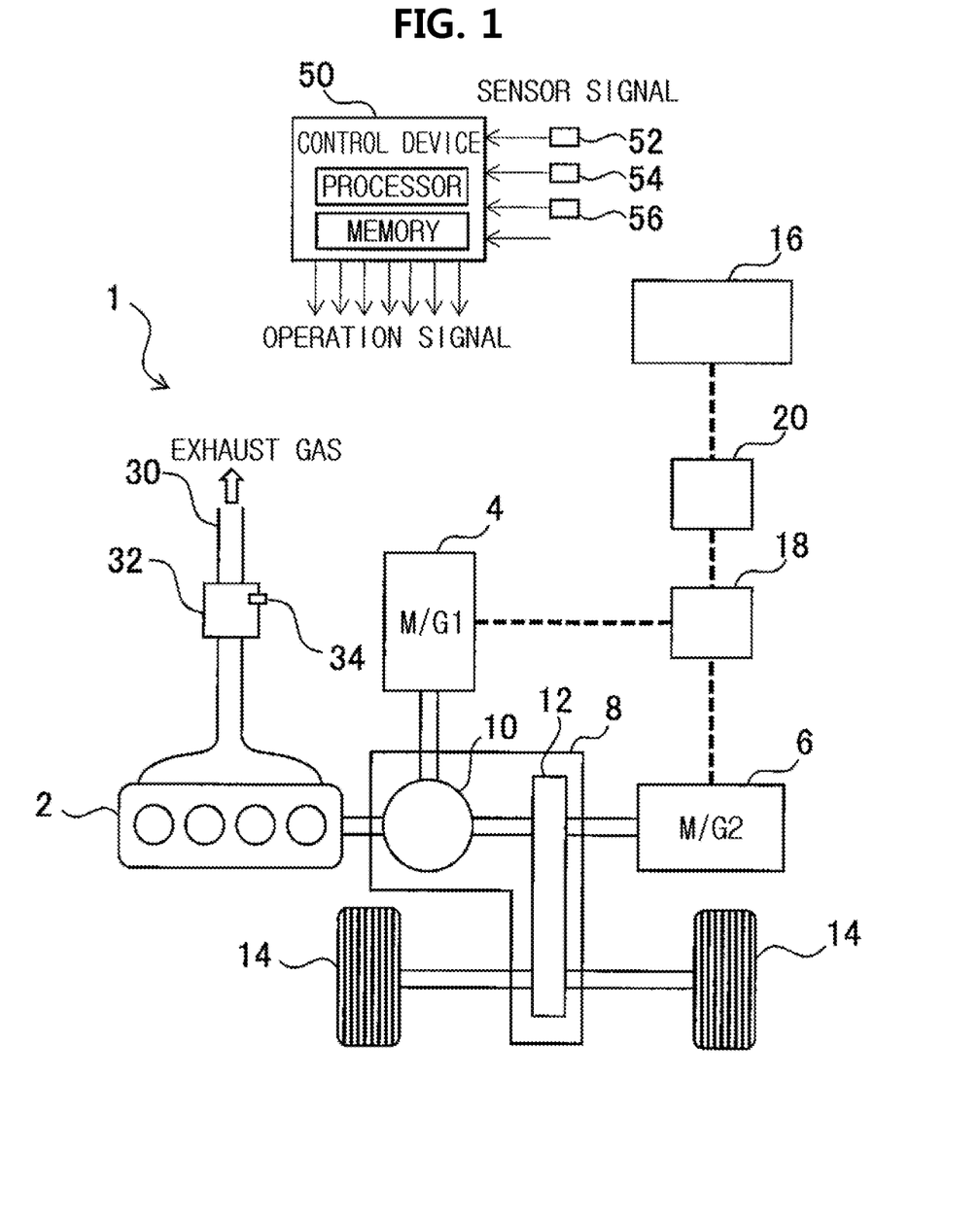
FIG. 1 is a diagram showing a configuration of a vehicle control system according to Embodiment 1.

FIG. 1 is a diagram showing a configuration of a vehicle control system according to Embodiment 1. A vehicle 1 shown in FIG. 1 is a split-type hybrid vehicle having a plurality of power devices. More specifically, the vehicle 1 includes an engine 2 as one power device for rotationally driving a vehicle wheel 14. The engine 2 is an internal combustion engine that outputs power by the combustion of a hydrocarbon-based fuel such as gasoline or light oil and includes an intake device, an exhaust device, a fuel injection device, an ignition device, a cooling device, and the like. An exhaust passage 30 constituting the exhaust device is provided with a catalyst 32 for purifying an exhaust gas. The catalyst 32 is provided with a temperature sensor 34 for detecting a catalyst temperature.

The vehicle 1 includes a first motor generator 4 and a second motor generator 6 which are electric motors capable of generating electric power as a separate power device for rotationally driving the vehicle wheel 14. The first motor generator 4 and the second motor generator 6 are AC synchronous generator motors each having a function as an electric motor outputting a torque by electric power supplied thereto and a generator converting input mechanical power into electric power. The first motor generator 4 is mainly used as a generator and the second motor generator 6 is mainly used as an electric motor.

The engine 2, the first motor generator 4, and the second motor generator 6 are connected to the vehicle wheel 14 by a power transmission mechanism 8. The power transmission mechanism 8 includes a power split device 10 and a speed reduction mechanism 12. The power split device 10 is, for example, a planetary gear unit and distributes the torque output from the engine 2 to the first motor generator 4 and the vehicle wheel 14. The torque output from the engine 2 or the torque output from the second motor generator 6 is transmitted to the vehicle wheel 14 via the speed reduction mechanism 12.

The first motor generator 4 regenerates electric power by the torque supplied through the power split device 10. In a state in which a torque is not output from the engine 2 and the second motor generator 6, when the first motor generator 4 regenerates electric power, a regenerative braking force is transmitted from the first motor generator 4 to the vehicle wheel 14 via the power transmission mechanism 8 so that the speed of the vehicle 1 decreases. That is, the vehicle 1 can perform a regenerative braking operation by the first motor generator 4.

The first motor generator 4 and the second motor generator 6 exchange electric power with the battery 16 via an inverter 18 and a converter 20. The inverter 18 is designed such that electric power generated by any one of the first motor generator 4 and the second motor generator 6 is consumed by the other thereof. The inverter 18 converts electric power stored in the battery 16 from a direct current to an alternating current and supplies the alternating current to the second motor generator 6 and converts electric power generated by the first motor generator 4 from an alternating current to a direct current and stores the direct current in the battery 16. For this reason, the battery 16 is charged or discharged by electric power or insufficient electric power generated in any one of the first motor generator 4 and the second motor generator 6.

The vehicle 1 includes a control device 50 which controls the operations of the engine 2, the first motor generator 4, the second motor generator 6, the power split device 10, and the like to control the traveling of the vehicle 1. The control device 50 is an Electronic Control Unit (ECU) which includes at least one processor and at least one memory. The memory stores various programs for controlling the traveling of the vehicle 1 or various data including a map. When the program stored in the memory is executed by the processor, various functions are realized in the control device 50. The intake air amount control, the fuel injection control, the ignition timing control, or the like of the engine 2 is executed by the control device 50. Power running control in which the first motor generator 4 or the second motor generator 6 functions as an electric motor or regenerative control in which the first motor generator 4 or the second motor generator 6 functions as a generator is also executed by the control device 50. Furthermore, the control device 50 may be configured as a plurality of ECUs.

The control device 50 receives and processes the signals of sensors provided in the vehicle 1. The sensors are mounted on various parts of the vehicle 1. The vehicle 1 is equipped with a rotation speed sensor 52 which detects a rotation speed of a crank shaft, an accelerator position sensor 54 which outputs a signal corresponding to an accelerator pedal stepping amount as an accelerator opening degree, a vehicle speed sensor 56 which detects a vehicle speed, and the like in addition to the temperature sensor 34. Furthermore, although there are many sensors other than the sensors connected to the control device 50 in the drawings, a description thereof will be omitted in the present specification. The control device 50 executes various programs by using received sensor signals and outputs an operation signal for operating an actuator.

The control of the vehicle 1 which is executed by the control device 50 includes torque control that controls the torque transmitted to the vehicle wheel 14. In the torque control herein, an engine torque Te and a motor torque Tm are controlled so that the torque transmitted to the vehicle wheel 14 becomes a required driving force.

The engine torque Te is a torque which is generated by the engine 2. The control device 50 executes the intake air amount control, the fuel injection control, and the ignition timing control of the engine 2 so that the engine torque Te becomes the target engine torque.

The motor torque Tm is a torque which is transmitted from the first motor generator 4 or the second motor generator 6 to the vehicle wheel 14. The motor torque Tm is mainly constituted by a torque output from the second motor generator 6. However, the motor torque Tm may include a negative torque output from the first motor generator 4 at the time of the speed reduction in which the regenerative braking force of the first motor generator 4 is transmitted to the vehicle wheel 14. The control device 50 executes the power running control or the regenerative control of the first motor generator 4 and the second motor generator 6 so that the motor torque Tm becomes a target motor torque.

Here, there is a problem that exhaust emission characteristics deteriorate during the warm-up of the catalyst 32 in the torque control of the vehicle 1. That is, for example, during a period when the catalyst 32 does not reach an active temperature, such as immediately after the cold start of the engine 2, the purification performance of the catalyst 32 is in a low state. When the transient operation of the engine 2 is performed during such catalyst warm-up period, an air-fuel ratio fluctuates and the exhaust emission characteristics deteriorate.

Figure 2:
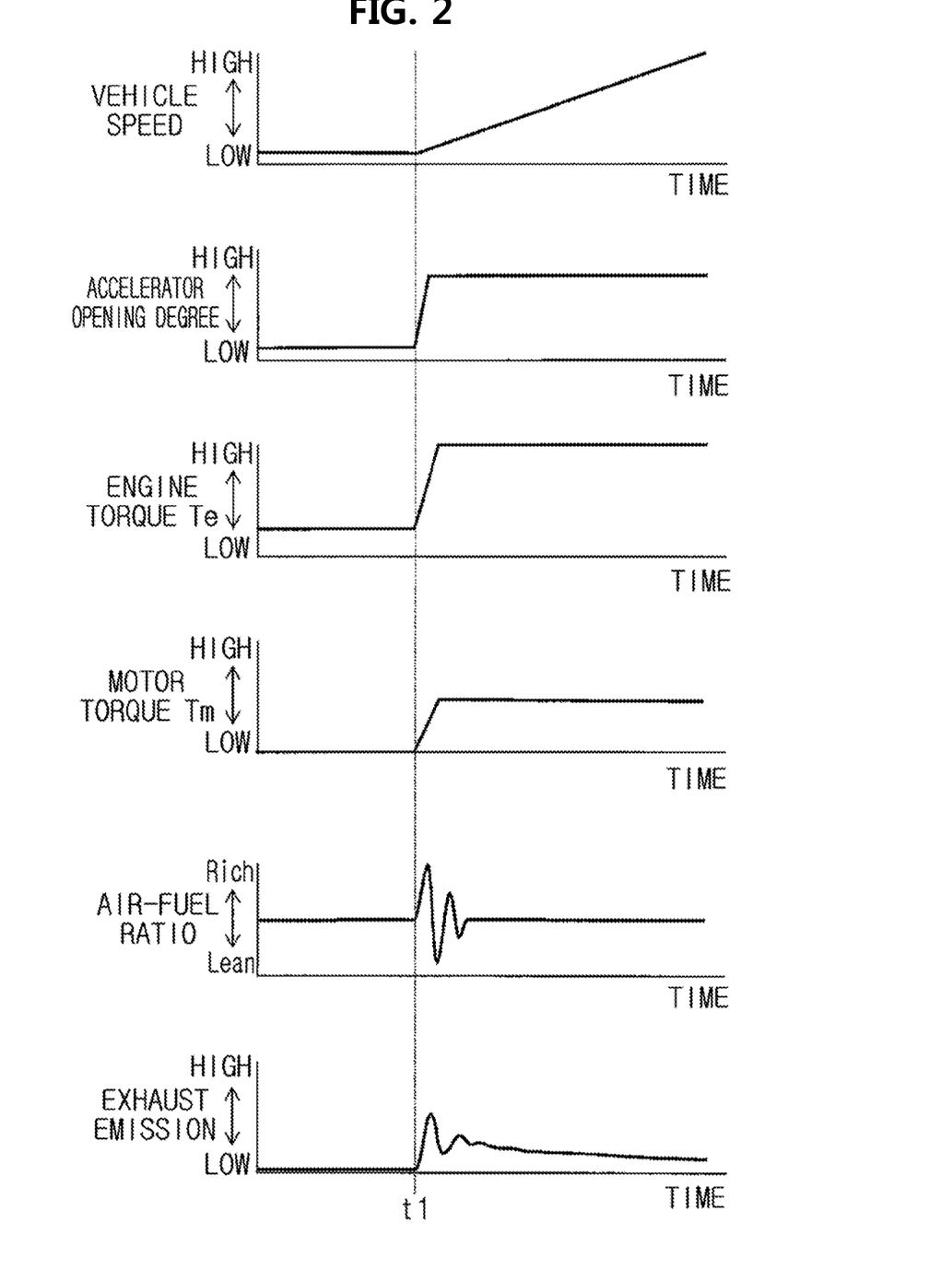
FIG. 2 is a timing chart showing an operation of torque control during catalyst warm-up according to a comparative example.

Here, one comparative example will be mentioned in order to clarify the problem of the torque control. FIG. 2 is a timing chart showing an operation of torque control during catalyst warm-up according to a comparative example. Furthermore, in FIG. 2, a first chart shows a change in vehicle speed of the vehicle with time, a second chart shows a change in accelerator opening degree with time, a third chart shows a change in engine torque Te with time, a fourth chart shows a change in motor torque Tm with time, a fifth chart shows a change in fuel-air ratio with time, and a sixth chart shows a change in exhaust emission with time.

The comparative example shown in FIG. 2 shows a case in which a driver steps on an accelerator pedal to suddenly accelerate the vehicle at a time t1 during catalyst warm-up. When the accelerator opening degree changes to an increase side, the engine torque Te and the motor torque Tm change to an increase side so that a required driving force corresponding to the accelerator opening degree is realized. When the engine torque Te suddenly increases, the air-fuel ratio temporarily fluctuates and the exhaust gas flow amount increases accordingly. In a comparative example shown in FIG. 2, since the catalyst 32 is warming up, the exhaust emission characteristics deteriorate due to the influence of a fluctuation of the air-fuel ratio and increase of the exhaust gas flow amount.

Therefore, in the torque control of Embodiment 1, the above-described problems are solved by limiting the torque change amount (hereinafter, referred to as a "torque rate") of the engine torque Te during catalyst warm-up. Hereinafter, the torque control of Embodiment 1 will be described in more detail with reference to FIG. 3.

Figure 3:
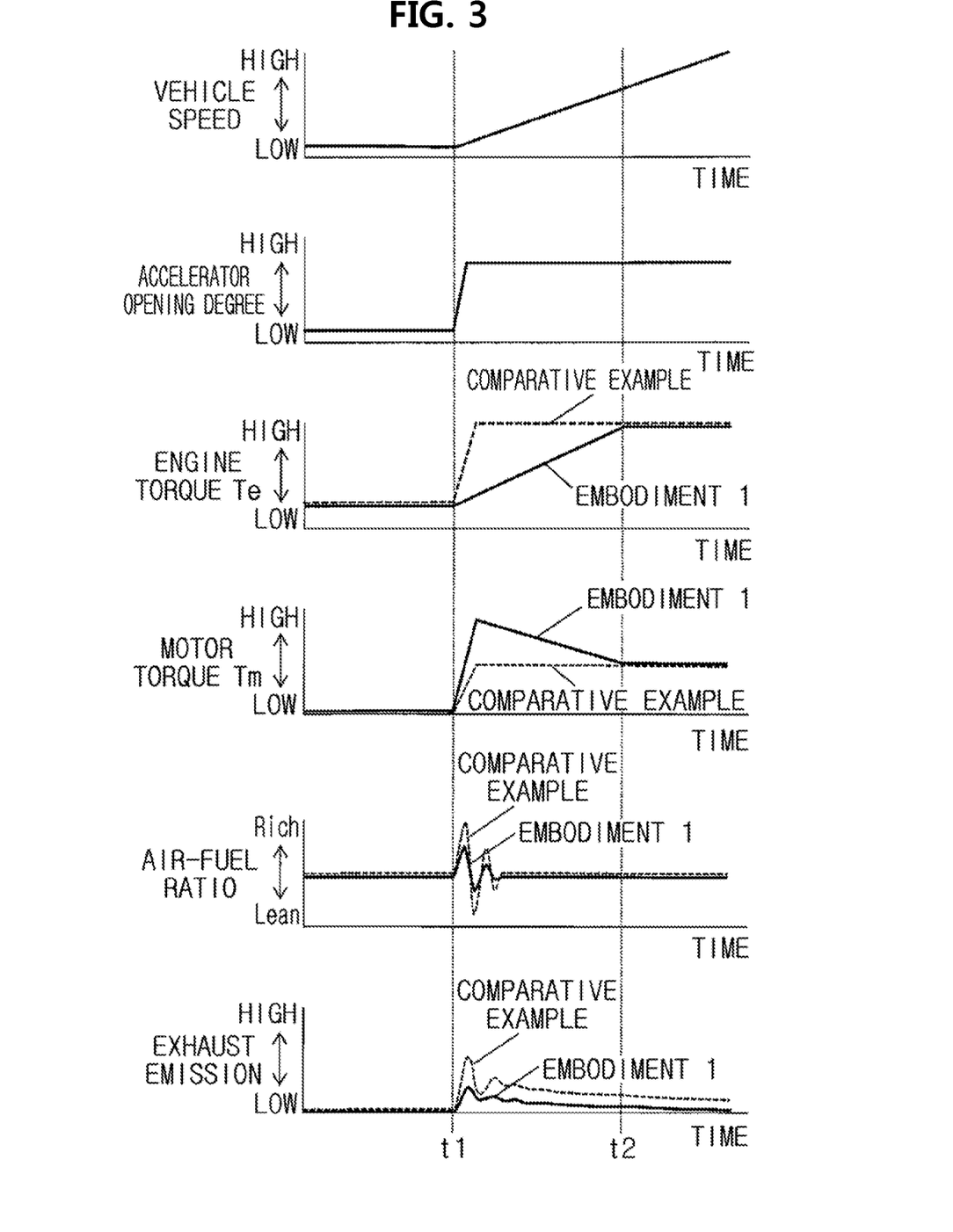
FIG. 3 is a timing chart showing an operation of torque control during catalyst warm-up according to Embodiment 1.

FIG. 3 is a timing chart showing an operation of the torque control during catalyst warm-up according to Embodiment 1. Furthermore, in FIG. 3, a first chart shows a change in vehicle speed of the vehicle with time, a second chart shows a change in accelerator opening degree with time, a third chart shows a change in engine torque Te with time, a fourth chart shows a change in motor torque Tm with time, a fifth chart shows a change in air-fuel ratio with time, and a sixth chart shows a change in exhaust emission with time.

As shown in FIG. 3, in the torque control of Embodiment 1, the torque rate in the case of changing the engine torque Te is set to be lower than that of the comparative example. According to such torque control, during a transient operation in which the engine torque Te is changing, it is possible to obtain an effect of suppressing the fluctuation of the air-fuel ratio and the effect of decreasing the exhaust gas flow amount as compared with the comparative example. Accordingly, since the increase of the exhaust emission is suppressed, it is possible to improve the emission characteristics.

Figure 4:
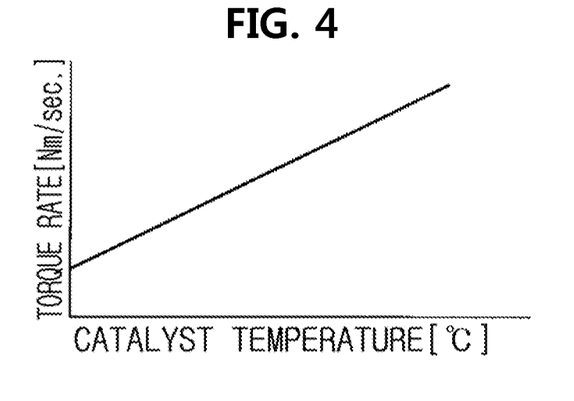
FIG. 4 is a diagram showing a relationship between a catalyst temperature and a torque rate.

Furthermore, from the viewpoint of increasing the responsiveness of the engine torque Te, it is preferable to extremely increase the torque rate as much as possible as long as it is possible to suppress the deterioration of exhaust emission. Therefore, in the torque control of Embodiment 1, the torque rate is set in response to the catalyst temperature. FIG. 4 is a diagram showing a relationship between a catalyst temperature and a torque rate. As shown in this drawing, the torque rate can be set to, for example, a high value as the catalyst temperature increases. According to such a setting of the torque rate, the torque rate when the catalyst temperature belongs to a predetermined low temperature region is set to be lower than the torque rate when the catalyst temperature belongs to a high temperature region having a temperature higher than the low temperature region. The purification performance of the catalyst 32 is improved as the catalyst temperature increases. For this reason, according to the setting of the torque rate, the torque rate can be increased as the purification performance of the catalyst 32 increases. Accordingly, it is possible to optimize suppression of the deterioration of exhaust emission characteristics and improvement of the torque responsiveness of the engine torque Te.

Further, as shown in FIG. 3, when the torque rate is set to be lower than that of the comparative example, the engine torque Te during the transient operation decreases accordingly. Therefore, in the torque control of Embodiment 1, it is preferable to adopt a control configuration that supplements the decrease in the engine torque Te by the motor torque Tm. In the chart shown in FIG. 3, during the transient operation from the time t1 to the time t2 when the engine torque Te is changing, the motor torque Tm is set so that the sum of the engine torque Te and the motor torque Tm becomes closer to the required driving force. Accordingly, the motor torque Tm during the transient operation is set to a value higher than that of the comparative example. According to such control, it is possible to supplement a torque which is insufficient to the required driving force by increasing the motor torque Tm. Accordingly, it is possible to make the torque output from the vehicle 1 to be closer to the required driving force while suppressing deterioration of exhaust emission characteristics even in a state in which the purification performance of the catalyst is low.

Figure 5:
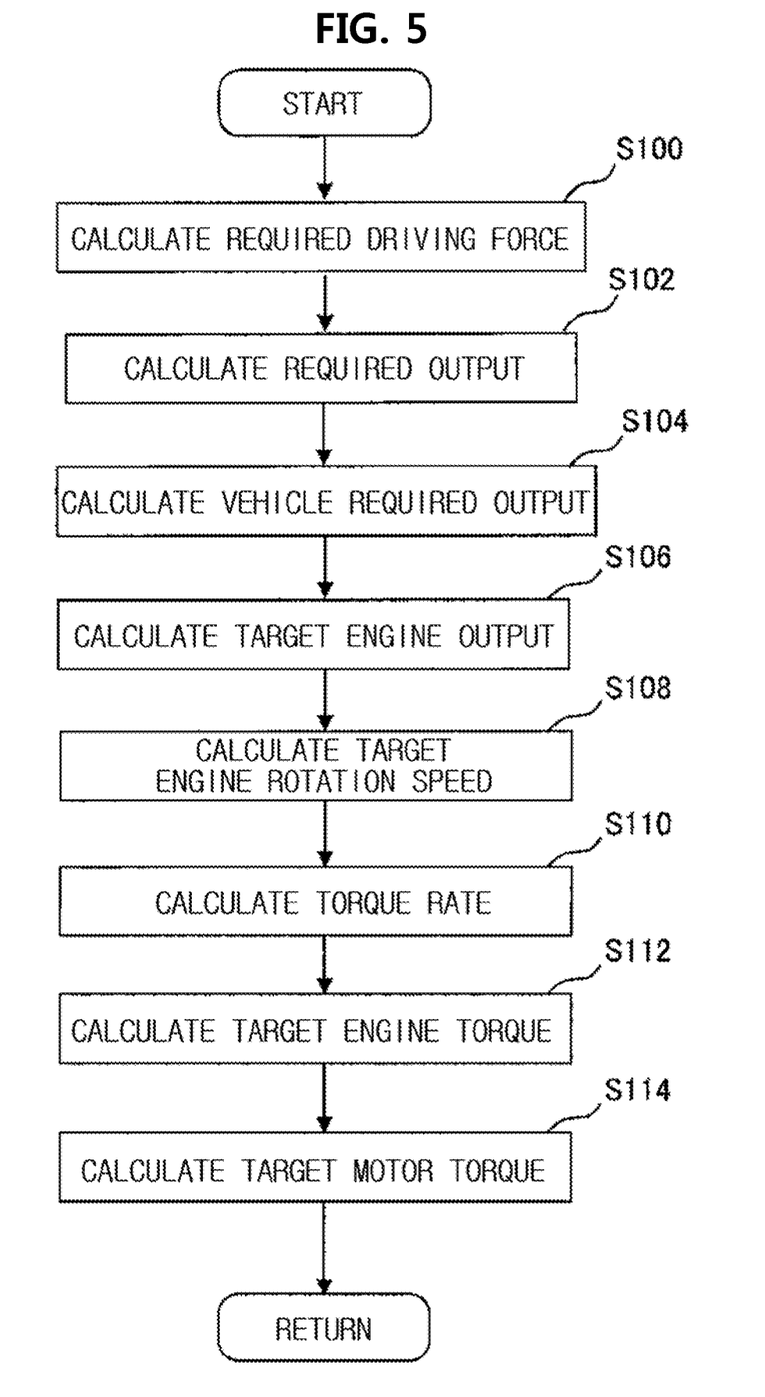
FIG. 5 is a flowchart showing a routine for torque control executed by a control device of Embodiment 1.

FIG. 5 is a flowchart showing a routine for torque control executed by the control device 50 of Embodiment 1. The processor of the control device 50 executes a program indicated by the flowchart at a predetermined period. Hereinafter, the contents of the torque control of Embodiment 1 will be described according to the flowchart.

In the flowchart shown in FIG. 5, first, a required driving force that is required for the vehicle 1 by a driver is calculated on the basis of the accelerator opening degree or the like detected by the accelerator position sensor 54 (step S100). Next, a required output for realizing the required driving force is calculated on the basis of the vehicle speed detected by the vehicle speed sensor 56 and the required driving force calculated in step S100 (step S102).

Next, a vehicle required output required for the vehicle 1 is calculated (step S104). Here, a value obtained by adding a charging/discharging required output determined from the charging/discharging request of the battery 16 to the required output is calculated as the vehicle required output. Next, a target engine output for realizing the vehicle required output is calculated on the basis of the output ratio of the engine 2 with respect to the first motor generator 4 and the second motor generator 6 (step S106). Next, a target engine rotation speed is calculated (step S108). The memory of the control device 50 stores a map defining a relationship of the engine rotation speed, the engine torque, the engine output, and an optimal fuel consumption rate. Here, using the map, the engine rotation speed corresponding to the target engine output according to the optimal fuel consumption rate is calculated as the target engine rotation speed.

Next, a torque rate is calculated (step S110). Here, specifically, first, the catalyst temperature is detected by the temperature sensor 34. Then, the torque rate corresponding to the detected catalyst temperature is calculated according to a relationship between the catalyst temperature and the torque rate shown in FIG. 4.

Next, a target engine torque that is a target value of the engine torque Te is calculated by using the calculated torque rate (step S112). Next, a target motor torque that is a target value of the motor torque Tm is calculated by subtracting the target engine torque from the required driving force (step S114).

It is possible to execute the torque control according to the purification performance of the catalyst 32 by executing the torque control using the target engine torque, the target engine rotation speed, and the target motor torque calculated according to the above-described sequence. Accordingly, since the torque rate when the purification performance of the catalyst 32 is low is set to be low, it is possible to suppress deterioration of exhaust emission characteristics.

Note that the disclosure is not limited to Embodiment 1 described above, and it is possible to adopt a modified form as follows without departing from the gist of the present disclosure.

In Embodiment 1, the split-type hybrid vehicle capable of freely combining or dividing the torque obtained from the engine 2, the first motor generator 4, and the second motor generator 6 has been described as an example. However, the vehicle 1 which adopts the control system of Embodiment 1 may be a vehicle that adopts another hybrid type. For example, the vehicle 1 may be a so-called parallel type hybrid vehicle which uses a plurality of power sources including an engine for driving a vehicle wheel. Further, the vehicle 1 may be a so-called series type hybrid vehicle which uses an engine only for generating electric power and uses a motor generator for driving a vehicle wheel and regenerating electric power. Furthermore, this modified example can be also applied to the control system of Embodiment 2 to be described later.

The vehicle 1 that adopts the control system of Embodiment 1 is not limited to the hybrid vehicle. That is, the vehicle 1 may be a vehicle which is equipped with only the engine 2 as a power device for rotationally driving the vehicle wheel 14. Furthermore, this modified example can be also applied to the control system of Embodiment 2 to be described later.

The disclosure is not limited to a configuration in which the catalyst temperature of the catalyst 32 is detected by the temperature sensor 34. That is, as the catalyst temperature, the temperature of the exhaust gas discharged to the downstream side of the catalyst 32 may be used. Further, the catalyst temperature may be estimated from the operation state of the engine 2 according to a known method.

The torque control according to Embodiment 1 is not limited to the case where there is a request for increasing the torque to the vehicle, but may be executed when there is a request for decreasing the torque to the vehicle. That is, for example, in a case where a torque reduction request is issued during catalyst warm-up, it is also considered that fuel cut is not performed by another control request such as catalyst warm-up control. In this case, it is possible to suppress a fluctuation in air-fuel ratio by decreasing a change amount of the engine torque Te to a decrease side. Further, at this time, a torque transmitted to an axle may be controlled to be closer to the required driving force by generating a negative motor torque Tm by the regenerative control of the first motor generator 4. Furthermore, this modified example can be also applied to the control system of Embodiment 2 to be described later.

Figure 6:
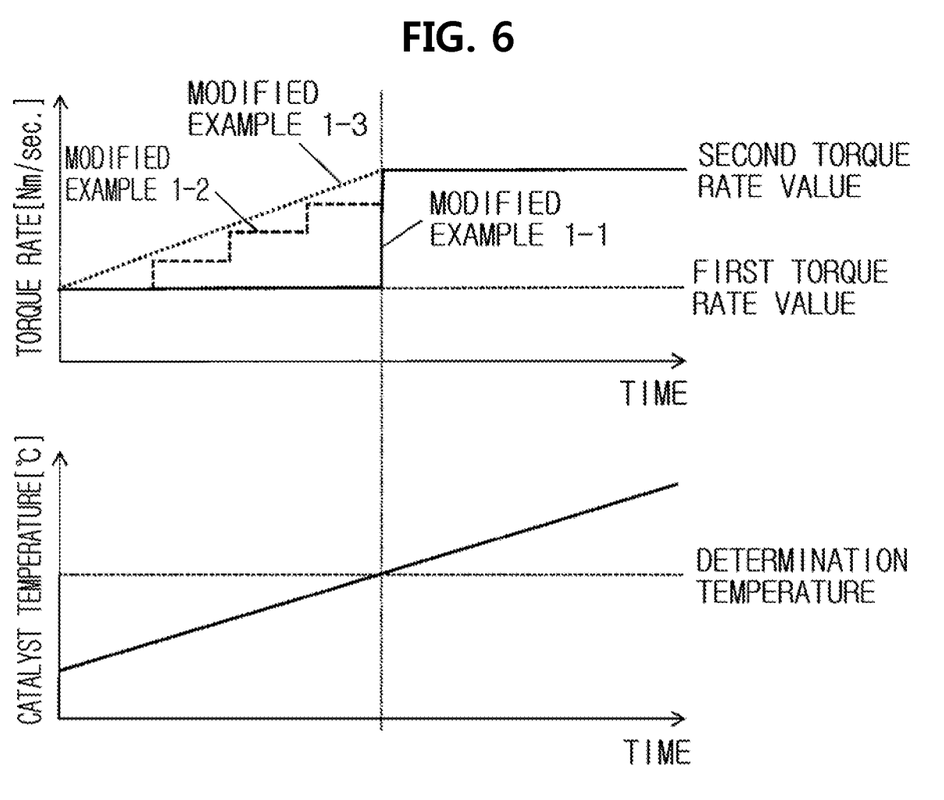
FIG. 6 is a diagram showing a modified example of a torque rate setting method of Embodiment 1.

The calculation of the torque rate is not limited to a method of using a relationship shown in FIG. 4. FIG. 6 is a diagram showing a modified example of a torque rate setting method of Embodiment 1. In Modified Example 1-1 shown in this drawing, the torque rate is fixed to a predetermined first torque rate value in a low temperature region until the catalyst temperature becomes a determination temperature and the torque rate is switched from the predetermined first torque rate value to a second torque rate value higher than the first torque rate value when the catalyst temperature exceeds the determination temperature and shifts to a high temperature region. The determination temperature can be set to, for example, an active temperature of the catalyst 32. According to such control, before the activity of the catalyst 32 is developed, it is possible to suppress deterioration of exhaust emission by decreasing the torque rate, and after the activity of the catalyst 32 is developed, it is possible to increase the responsiveness of the engine torque Te by increasing the torque rate.

In Modified Example 1-2 shown in FIG. 6, the torque rate is stepwisely increased in response to an increase in catalyst temperature until the catalyst temperature becomes the determination temperature. According to such control, it is possible to stepwisely set the torque rate in response to the catalyst temperature before the activity of the catalyst 32 is developed. Accordingly, it is possible to stepwisely increase the responsiveness of the engine torque Te while suppressing deterioration of exhaust emission.

In Modified Example 1-3 shown in FIG. 6, the torque rate is continuously increased in response to an increase in catalyst temperature until the catalyst temperature becomes the determination temperature. According to such control, it is possible to continuously set the torque rate in response to the catalyst temperature before the activity of the catalyst 32 is developed. Accordingly, it is possible to continuously increase the responsiveness of the engine torque Te while suppressing deterioration of exhaust emission.

Next, Embodiment 2 will be described. A control system of Embodiment 2 can be realized by executing a routine shown in FIG. 8 to be described by the control device 50 using hardware shown in FIG. 1.

In the torque control of Embodiment 1, the torque rate is set in response to the catalyst temperature. In contrast, the torque control of Embodiment 2 has a characteristic in the operation of setting the torque rate in response to the elapse time from the cold start of the engine 2.

When a cold start of the engine 2 is performed, the catalyst temperature gradually increases with time and finally reaches an active temperature. For this reason, the catalyst temperature until the elapse time becomes a predetermined determination time is lower than the catalyst temperature after the determination time elapses. In other words, it can be mentioned that the catalyst temperature belongs to the low temperature region until the elapse time becomes a predetermined determination time and the catalyst temperature belongs to the high temperature region having the temperature higher than the low temperature region after the determination time elapses.

Figure 7:
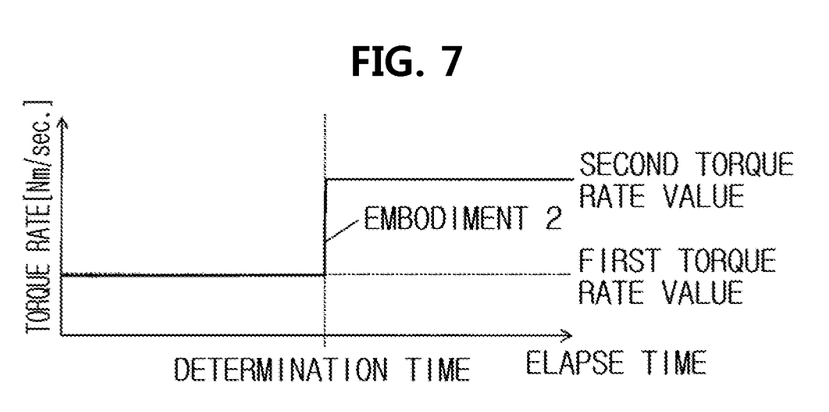
FIG. 7 is a diagram showing a relationship between a torque rate and an elapse time from a cold start of an engine.

Therefore, in the torque control of Embodiment 2, the torque rate is set in response to the elapse time from the cold start of the engine 2. FIG. 7 is a diagram showing a relationship between a torque rate and an elapse time from the cold start of the engine. As shown in this drawing, in the torque control of Embodiment 2, the torque rate is fixed to a predetermined first torque rate value in a period until the elapse time from the cold start of the engine 2 becomes the predetermined determination time and the torque rate is switched from the predetermined first torque rate value to a second torque rate value higher than the first torque rate value when the elapse time exceeds the determination time. As the determination time, for example, a value which is obtained in advance by an experiment or the like as the elapse time until the warm-up of the catalyst 32 is completed from the cold start can be used. According to the torque control, before the activity of the catalyst 32 is developed, it is possible to suppress deterioration of exhaust emission by decreasing the torque rate, and after the activity of the catalyst 32 is developed, it is possible to increase the responsiveness of the engine torque Te by increasing the torque rate.

Figure 8:
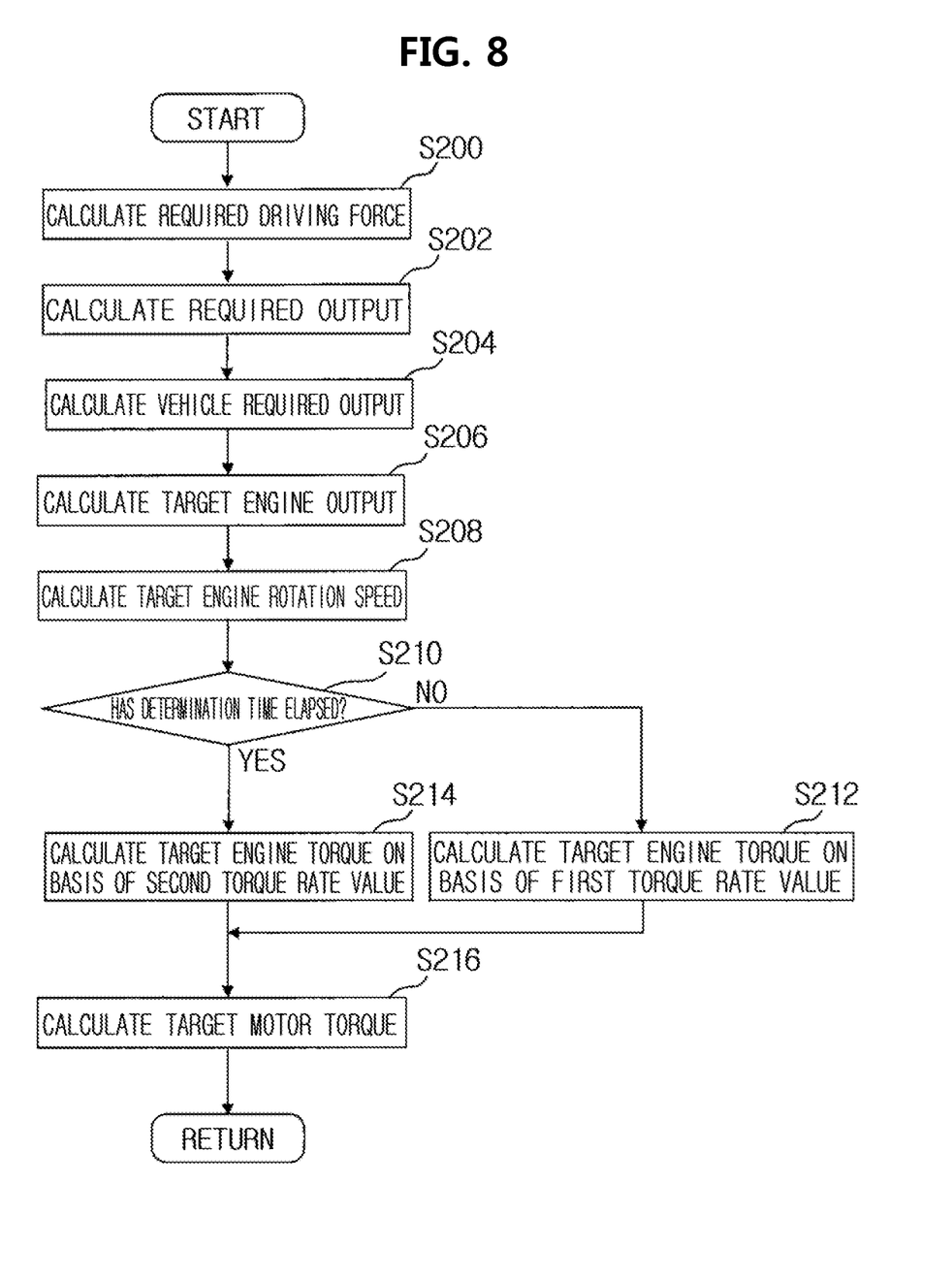
FIG. 8 is a flowchart showing a routine for torque control executed by a control device of Embodiment 2.

FIG. 8 is a flowchart showing a routine for torque control executed by the control device 50 of Embodiment 2. The processor of the control device 50 executes a program indicated by the flowchart at a predetermined period when the cold start of the engine 2 is performed. Hereinafter, the contents of the torque control of Embodiment 2 will be described according to the flowchart.

From steps S200 to S208 of the routine shown in FIG. 8, the same processes as those of steps S100 to S108 shown in FIG. 5 are executed. When the process of step S208 is executed, it is determined whether the elapse time from the cold start of the engine 2 reaches a predetermined determination time (step S210). As a result, when the establishment of the determination is not allowed, it is determined that the warm-up of the catalyst 32 is not completed and the target engine torque is calculated on the basis of the first torque rate value (step S212). Meanwhile, when the establishment of the determination is allowed, it is determined that the warm-up of the catalyst 32 is completed and the target engine torque is calculated on the basis of the second torque rate value higher than the first torque rate value (step S214).

When the process of step S212 or step S214 is executed, the target motor torque is calculated by subtracting the target engine torque from the required driving force (step S216).

By executing the torque control using the target engine torque, the target engine rotation speed, and the target motor torque calculated according to the above-described sequence, it is possible to execute the torque control in response to the purification performance of the catalyst 32 without detecting the catalyst temperature. Accordingly, since the torque rate is set to be low when the purification performance of the catalyst 32 is low, it is possible to suppress deterioration of exhaust emission characteristics.

Note that the disclosure is not limited to Embodiment 2 described above and modifications as described below can be adopted within a range not deviating from the gist of the present disclosure.

Figure 9:
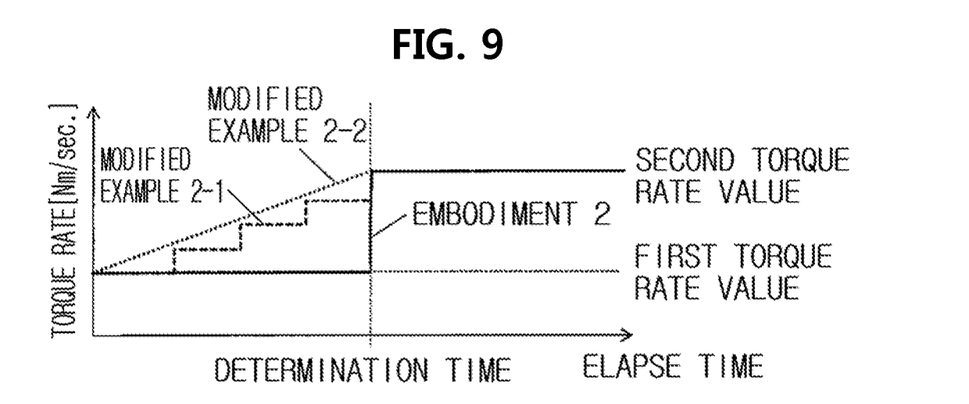
FIG. 9 is a diagram showing a modified example of a torque rate setting method of Embodiment 2.

The calculation of the torque rate is not limited to a method of using a relationship shown in FIG. 7. FIG. 9 is a diagram showing a modified example of a torque rate setting method of Embodiment 2. In Modified Example 2-1 shown in FIG. 9, the torque rate stepwisely increases in response to an increase in catalyst temperature until the elapse time becomes the determination time. According to the torque control, it is possible to stepwisely set the torque rate in response to the catalyst temperature before the activity of the catalyst 32 is developed. Accordingly, it is possible to stepwisely increase the responsiveness of the engine torque Te while suppressing deterioration of exhaust emission.

In Modified Example 2-2 shown in FIG. 9, the torque rate is continuously increased in response to an increase in catalyst temperature until the elapse time becomes the determination time. According to the torque control, it is possible to continuously set the torque rate in response to the catalyst temperature before the activity of the catalyst 32 is developed. Accordingly, it is possible to continuously improve the responsiveness of the engine torque Te while suppressing deterioration of exhaust emission.

What is claimed is:

1. A vehicle comprising:
an internal combustion engine;
a catalyst that is provided in an exhaust passage of the internal combustion engine; and an electronic control unit,
the electronic control unit being configured to control an engine torque such that a first torque change amount of the engine torque to be lower than a second torque change amount of the engine torque,
the first torque change amount being a torque change amount when a temperature of the catalyst belongs to a predetermined low temperature region, the second torque change amount being a torque change amount when the temperature of the catalyst belongs to a high temperature region, and the high temperature region being a region having a temperature higher than the predetermined low temperature region.

2. The vehicle according to claim 1, further comprising:
an electric motor that is connected to a vehicle wheel via a power transmission mechanism; and
a battery that stores electric power for driving the electric motor,
wherein the electronic control unit is configured to control the engine torque and a motor torque transmitted to the vehicle wheel by the electric motor based on a required driving force required for the vehicle.

3. The vehicle according to claim 2, wherein
the electronic control unit is configured to supplement the engine torque with the motor torque, when the engine torque is insufficient, such that a driving force of the vehicle becomes closer to the required driving force when the temperature of the catalyst belongs to the predetermined low temperature region.

4. The vehicle according to claim 1, wherein,
the electronic control unit is configured to control the engine torque such that the first torque change amount of the engine torque when the temperature of the catalyst is lower than a predetermined determination temperature to be lower than the second torque change amount of the engine torque when the temperature of the catalyst is higher than the predetermined determination temperature.

5. The vehicle according to claim 4, wherein,
the electronic control unit is configured to increase the first torque change amount of the engine torque as the temperature of the catalyst increases when the temperature of the catalyst is lower than the predetermined determination temperature.

6. The vehicle according to claim 1, wherein,
the electronic control unit is configured to control the engine torque such that the first torque change amount of the engine torque for a predetermined period until a predetermined determination time elapses from a cold start of the internal combustion engine to be lower than the second torque change amount of the engine torque after the predetermined determination time elapses.

7. The vehicle according to claim 6, wherein,
the electronic control unit is configured to gradually increase the first torque change amount of the engine torque for the predetermined period.

8. A control method of a vehicle,
the vehicle including an internal combustion engine, a catalyst provided in an exhaust passage of the internal combustion engine, and an electronic control unit,
the control method comprising:
controlling, by the electronic control unit, an engine torque such that a first torque change amount of the engine torque to be smaller than a second torque change amount of the engine torque,
the first torque change amount being a torque change amount when a temperature of the catalyst belongs to a predetermined low temperature region, the second torque change amount being a torque change amount when the temperature of the catalyst belongs to a high temperature region, and the high temperature region being a region having a temperature higher than the predetermined low temperature region.

* * * * *